US008264646B2

(12) United States Patent
Jepsen

(10) Patent No.: US 8,264,646 B2
(45) Date of Patent: Sep. 11, 2012

(54) TRANSFLECTIVE DISPLAY WITH WHITE TUNING

(75) Inventor: Mary Lou Jepsen, Sausalito, CA (US)

(73) Assignee: Pixel Qi Corporation, San Bruno, CA (US)

( * ) Notice: Subject to any disclaimer, the term of this patent is extended or adjusted under 35 U.S.C. 154(b) by 545 days.

(21) Appl. No.: 12/510,485

(22) Filed: Jul. 28, 2009

(65) Prior Publication Data

US 2010/0020276 A1  Jan. 28, 2010

Related U.S. Application Data

(60) Provisional application No. 61/084,023, filed on Jul. 28, 2008, provisional application No. 61/084,018, filed on Jul. 28, 2008, provisional application No. 61/091,417, filed on Aug. 24, 2008.

(51) Int. Cl.
G02F 1/1335 (2006.01)

(52) U.S. Cl. .................................... 349/114; 349/106

(58) Field of Classification Search .......... 349/106–109, 349/113–114
See application file for complete search history.

(56) References Cited

U.S. PATENT DOCUMENTS

| 5,748,828 | A | 5/1998 | Steiner et al. | |
|---|---|---|---|---|
| 6,341,002 | B1 | 1/2002 | Shimizu et al. | |
| 6,801,274 | B2 | 10/2004 | Suzuki | |
| 6,930,664 | B2 * | 8/2005 | Kim et al. | 345/99 |
| 7,008,409 | B2 | 3/2006 | Spiezio et al. | |
| 7,030,946 | B2 | 4/2006 | Iijima et al. | |
| 7,196,766 | B2 * | 3/2007 | Yang et al. | 349/192 |
| 7,248,315 | B2 | 7/2007 | Arai et al. | |
| 7,358,943 | B2 | 4/2008 | Asao | |
| 7,388,635 | B2 | 6/2008 | Aoki | |
| 7,463,327 | B2 | 12/2008 | Tasaka et al. | |
| 7,746,431 | B2 * | 6/2010 | Jepsen | 349/114 |

(Continued)

FOREIGN PATENT DOCUMENTS

JP  2003-248221 A  9/2003

(Continued)

OTHER PUBLICATIONS

International Searching Authority, "International Search Report and Written Opinion", application No. PCT/US2010/025439, dated Oct. 4, 2010, 12pages.

(Continued)

*Primary Examiner* — Dung T. Nguyen
(74) *Attorney, Agent, or Firm* — Hickman Palermo Truong Becker Bingham Wong LLP

(57) ABSTRACT

In an embodiment, a multi-mode LCD comprises pixels, each comprising sub-pixels, each sub-pixel comprising a first polarizing layer; a second polarizing layer; a first substrate layer and an oppositely oriented second substrate layer, the first and second substrate layers are between the first and second polarizing layers; a liquid crystal material between the first and second substrate layers; a first reflective layer that is adjacent to the first substrate layer and comprises at least one opening that forms a transmissive part of the sub-pixel and wherein a remainder of the first reflective layer that forms a reflective part of the sub-pixel; a first filter of a first color opposite to and covering the transmissive part with an area larger than that of the transmissive part; a second filter of a second color opposite to and partially covering the reflective part, wherein the second color is different from the first color.

30 Claims, 7 Drawing Sheets

U.S. PATENT DOCUMENTS

| | | |
|---|---|---|
| 2002/0145688 A1 | 10/2002 | Sekiguchi |
| 2002/0154257 A1 | 10/2002 | Iijima |
| 2004/0201560 A1 | 10/2004 | Shen et al. |
| 2004/0201814 A1 | 10/2004 | Yamamoto |
| 2004/0252092 A1 | 12/2004 | Roosendaal |
| 2005/0083453 A1 | 4/2005 | Nakano et al. |
| 2005/0174514 A1 | 8/2005 | Iijima |
| 2006/0044240 A1 | 3/2006 | Takizawa et al. |
| 2007/0046606 A1 | 3/2007 | Kim et al. |
| 2007/0075935 A1 | 4/2007 | Mesmer et al. |
| 2007/0164953 A1 | 7/2007 | Huang et al. |
| 2007/0242197 A1 | 10/2007 | Watson et al. |
| 2008/0030656 A1 | 2/2008 | Watson et al. |
| 2008/0068552 A1 | 3/2008 | Hu et al. |
| 2008/0074592 A1 | 3/2008 | Araki et al. |
| 2008/0117151 A1 | 5/2008 | Nurmi et al. |
| 2008/0117346 A1 | 5/2008 | Jepsen |
| 2010/0020276 A1 | 1/2010 | Jepsen |
| 2011/0025960 A1 | 2/2011 | Jepsen et al. |

FOREIGN PATENT DOCUMENTS

| | | |
|---|---|---|
| JP | 2004-045757 A | 2/2004 |
| JP | 2004-163893 A | 6/2004 |
| JP | 2004-279765 A | 10/2004 |
| KR | 10-2002-0051858 | 6/2002 |
| KR | 10-20040068398 | 7/2004 |
| KR | 10-2007-0054109 | 5/2007 |
| KR | 10-2009-0035868 | 4/2009 |

OTHER PUBLICATIONS

Current Claims, application No. PCT/US2010/025439, 6 pages.
International Searching Authority, "International Search Report and Written Opinion", application No. PCT/US2009/050787, dated Feb. 17, 2010, 10 pages.
Current Claims, application No. PCT/US2009/050787, 4 pages.
International Searching Authority, "International Search Report and Written Opinion", application No. PCT/US2009/051946, dated Mar. 3, 2010, 15 pages.
Current Claims, application No. PCT/US2009/051946, 11 pages.
International Searching Authority, "International Search Report and Written Opinion", application No. PCT/US2009/051950, dated Mar. 15, 2010, 10 pages.
Current Claims, application No. PCT/US2009/051950, 6 pages.
Wu, S.T., et al., "Mixed-Mode Twisted Nematic Liquid Crystal Cells for Reflective Displays", Applied Physics Letters, vol. 68, published Jan. 1996, 3.
Wright, et al., "Resolution and Legibility: A comparison of TFTLCDs and CRTs", SID Digest, 1999, 4 pages.
Yoshitake, et al., "The Relationship between Pixel Density and Readability on Computer Displays—Effectiveness of an Anti-Aliased Front on a High Density LCD", SID Digest, 2003, 4 pages.
Search Report with Written Opinion, in application No. PCT/US2001/061139, dated Apr. 26, 2012, 8 pages.
Current Claims in application No. PCT/US2001/061139, 7 pages.

* cited by examiner

TRANSFLECTIVE DISPLAY WITH WHITE TUNING

BENEFIT CLAIM

This application claims the benefit, under 35 U.S.C. 119 (e), of prior provisional application 61/084,023, filed Jul. 28, 2008, prior provisional application 61/084,018, filed Jul. 28, 2008, and prior provisional application 61/091,417, filed Aug. 24, 2008, the entire contents of which are hereby incorporated by reference for all purposes as if fully set forth herein.

CROSS REFERENCE TO RELATED APPLICATIONS

This application is related to U.S. patent application Ser. No. 12/503,793, filed Jul. 15, 2009, the entire contents of which are hereby incorporated by reference for all purposes as if fully disclosed herein.

TECHNICAL FIELD

The present disclosure relates, in general, to a display. More specifically, the disclosure relates to a multi-mode Liquid Crystal Display (LCD).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Monochromatic liquid crystal displays (LCDs) such as those used for gasoline pump display digital clock displays are typically optimized for the middle of the visible light spectrum. Compared with green, which lies in the middle of the spectrum, red and blue light do not transmit well. Therefore, monochromatic LCDs may look greenish even when displaying black-and-white or grayscale images. In addition, monochromatic LCDs are unsuitable for display color images or video.

Color LCDs may be used to display black-and-white or grayscale images. Each pixel of the color LCDs comprises three or more color sub-pixels that can be used to simulate different shades of gray. However, when used as monochromatic displays, the resolution of color LCDs is typically limited by the area of the pixels which is three times larger or coarser than the area of each sub-pixel. Color artifacts may remain visible in certain spots, causing viewers to see a red or blue tinge around the edges of a supposedly black or grayscale character.

Since the light passing through the color filters of the color sub-pixels is attenuated, color LCDs may use backlights in addition to, or instead of, ambient light. As a result, power consumption of color LCDs, even when used as monochromatic displays, is high in order to achieve an acceptable resolution.

LCDs are typically refreshed at 30, 60, or 120 frames per second. At these frame rates, an LCD consumes much more power than at lower rates. For example, at a 60-frames-per-second rate, an LCD may consume twice the power than it would at a 30-frames-per-second rate.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DETAILED DESCRIPTION

1. General Overview

Figure 1:
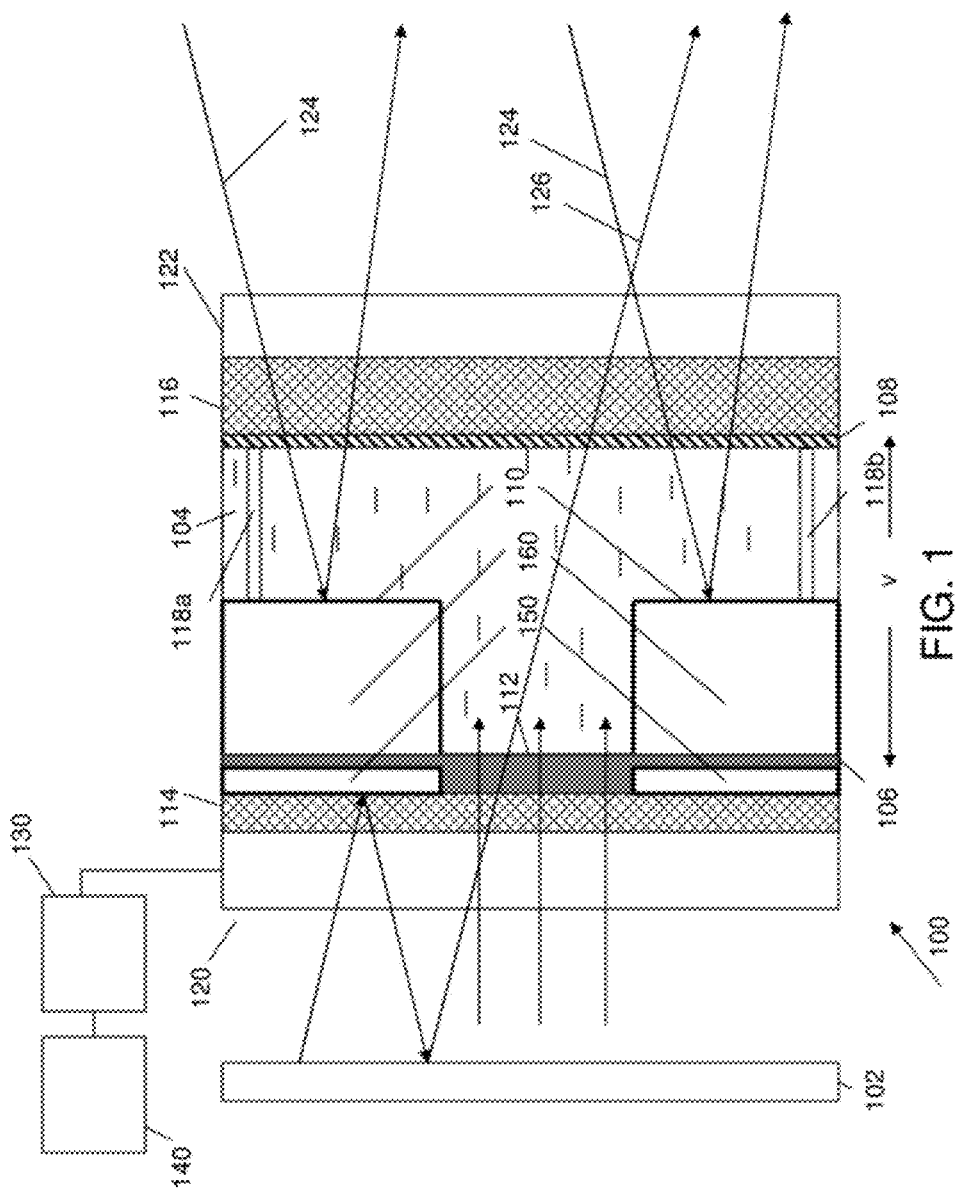
FIG. 1 is a schematic of a cross section of a sub-pixel of a LCD.

In an embodiment, a multi-mode LCD as described hereinafter provides better resolution and readability as compared to existing LCDs. In an embodiment, the power usage/consumption required by the LCD is reduced. In an embodiment, a sunlight readable display in the LCD is provided. In an embodiment, a roomlight readable display in the LCD is provided.

In some embodiments, the multi-mode LCD may comprise a plurality of pixels along a substantially planar surface, each pixel comprising a plurality of sub-pixels. A sub-pixel in the plurality of sub-pixels comprises a first polarizing layer with a first polarization axis and a second polarizing layer with a second polarization axis. The sub-pixel also comprises a first substrate layer and a second substrate layer opposite to the first substrate layer. The sub-pixel further comprises a first reflective layer adjacent to the first substrate layer. The first reflective layer may be made of roughened metal, comprising at least one opening that forms in part a transmissive part of the sub-pixel. The rest of the first reflective layer covered by the metal in the sub-pixel forms in part a reflective part of the sub-pixel. In some embodiments, a first filter of a first color is placed opposite to and covering the transmissive part with a larger area than an area of the transmissive part, while a second filter of a second color is placed opposite to and partially covering the reflective part. The second color is different from the first color.

The multi-mode LCD may further comprise a second reflector on one side of the first electrode layer, while the first reflective layer is on the opposite side of the first electrode layer. This second reflective layer may be made up of metal, comprising at least one opening that is a part of the transmissive part of the sub-pixel.

In an embodiment, the multi-mode LCD further comprises a light source for illuminating the multi-mode display. In an embodiment, a spectrum of color is generated from the light from the light source (or a back light) using a diffractive or a micro-optical film.

In an embodiment, placing color filters (for example, the first filter of the first color) over the transmissive part of a pixel, and different color filters (for example, the second filter of the second color) over a portion of the reflective part of the pixel, enables shifting of the monochrome white-point and a strong readability in ambient light. In an embodiment, the black matrix mask used typically in color filter creation is eliminated. Additionally, an embodiment provides horizontally oriented sub-pixels to improve the resolution of the LCD in the color transmissive mode. Additionally, an embodiment provides vertically oriented sub-pixels to improve the resolution of the LCD in the color transmissive mode. Further, an embodiment enables the light to switch between two colors, while a third color (typically green) is always on, thereby decreasing the required frame rate of the LCD when used in the hybrid field sequential approach. In an embodiment, colors are created from the backlight, thereby eliminating the need for color filters. In an embodiment, color filters are used over only the green pixels, thereby eliminating the need for using additional masks for making the color filter array.

In an embodiment, the cross sectional area of the reflective part of the sub-pixel may be over half of the total cross sectional area of the entire sub-pixel. For example, the reflective part may occupy 70% to 100% of the plurality of pixels. In an embodiment, in the multi-mode LCD, 1% to 50% of the reflective part in a sub-pixel is covered with one or more color filters.

In an embodiment, the transmissive part occupies an interior part of a cross section of the sub-pixel. In an embodiment, the first and second filters of different colors mentioned above may be configured to shift from a previous color tinged white point to a new monochrome colorless white point for the sub-pixel. In an embodiment, the transmissive part occupies 0% to 30% of the plurality of pixels. In an embodiment, the one or more color-filters are of different thicknesses. In an embodiment, the one or more color-filters are of a same thickness.

In an embodiment, the multi-mode Liquid Crystal Display further comprises one or more colorless spacers placed over the reflective part. In an embodiment, the one or more colorless spacers are of a same thickness. In an embodiment, the one or more colorless spacers are of different thicknesses.

In an embodiment, the multi-mode Liquid Crystal Display further comprises a driver circuit to provide pixel values to a plurality of switching elements, wherein the plurality of switching elements determines the light transmitting through the transmissive part. In an embodiment, the driver circuit further comprises a Transistor-Transistor-Logic interface. In an embodiment, the multi-mode Liquid Crystal Display further comprises a timing control circuit to refresh the pixel values of the multi-mode Liquid Crystal Display.

In an embodiment, the multi-mode Liquid Crystal Display as described herein forms a part of a computer, including but not limited to a laptop computer, notebook computer, ebook reader, cell phone, and netbook computer.

Various embodiments relate to a Liquid Crystal Display (LCD) that is capable of functioning in multi-mode, a monochrome reflective mode and a color transmissive mode. Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structural Overview

FIG. 1 is a schematic of a cross section of a sub-pixel 100 of a LCD. Sub-pixel 100 comprises a liquid crystal material 104, a sub-pixel electrode (or a first electrode layer) 106 that includes switching elements, a common electrode (or a second electrode layer) 108, a first reflective layer 160 that is located on one side of electrode 106, a second reflective layer 150 that is located on the other side of the electrode 106, a transmissive part 112, first and second substrate layers 114 and 116, spacers 118a and 118b, a first polarization layer 120, and a second polarization layer 122.

In an embodiment, first and second reflective layers 160 and 150 have an opening over the transmissive part 112. A surface of first reflective layer 160 forms in part a reflective part 110. A surface of second reflective layer 150 may be used to reflect light incident from the left-hand side of the surface. In an embodiment, a light source 102 or an ambient light 124 illuminates sub-pixel 100. Examples of light source 102 include, but are not limited to, Light Emitting Diodes backlights (LEDs), Cold-Cathode Fluorescent Lamps backlights (CCFLs), and the like. Ambient light 124 can be sunlight or any external source of light. In an embodiment, liquid crystal material 104, which is an optically active material, rotates the axis of the polarization of the light from light source 102 or ambient light 124. Liquid crystal 104 can be a Twisted Nematic (TN), an Electrically Controlled Birefringence (ECB) and the like. In an embodiment, the rotation of the polarization orientation of the light is determined by the potential difference applied between sub-pixel electrode 106, and common electrode 108. In an embodiment, sub-pixel electrode 106 and common electrode 108 can be made of Indium Tin Oxide (ITO). Further, each sub-pixel is provided with a sub-pixel electrode 106, while common electrode 108 is common to all the sub-pixels and pixels present in the LCD.

In an embodiment, reflective part 110 is electrically conductive and reflects ambient light 124 to illuminate sub-pixel 100. The first reflective layer 160 is made of metal and is electrically coupled to sub-pixel electrode 106 thereby providing the potential difference between reflective part 110 and common electrode 108. Transmissive part 112 transmits light from light source 102 to illuminate sub-pixel 100. Substrates 114 and 116 enclose liquid crystal material 104, pixel electrode 106 and common electrode 108. In an embodiment, sub-pixel electrode 106 is located at substrate 114, and common electrode 108 is located at substrate 116. Additionally, substrate 114 and subpixel electrode layer comprises switching elements (not shown in FIG. 1) In an embodiment, the switching elements can be Thin Film Transistors (TFTs). In another embodiment the switching elements can be low temperature polysilicon.

A driver circuit 130 sends signals related to sub-pixel values to the switching elements. In an embodiment, driver circuit 130 uses low voltage differential signaling (LVDS) drivers. In another embodiment, a transistor-transistor logic (TTL) interface that senses both increase and decrease in voltages is used in driver circuit 130. Additionally, a timing controller 140 encodes the signals related to sub-pixel values into the signals needed by the diagonal transmissive parts of the sub-pixels. Furthermore, timing controller 140 has a memory to allow self-refresh of the LCD when the signals related to the sub-pixels are removed from timing controller 140.

In an embodiment, spacers 118a and 118b are placed over reflective part 110 to maintain a uniform distance between substrates 114 and 116. Additionally, sub-pixel 100 comprises first polarizer 120 and second polarizer 122. In an embodiment, the axes of polarity of first polarizer 120 and second polarizer 122 are perpendicular to each other. In another embodiment, the axes of polarity of first polarizer 120 and second polarizer 122 are parallel to each other.

Sub-pixel 100 is illuminated by light source 102 or ambient light 124. The intensity of light passing through sub-pixel 100 is determined by the potential difference between sub-pixel electrode 106, and common electrode 108. In an embodiment, liquid crystal material 104 is in a disoriented state and the light passing through first polarizer 120 is blocked by second polarizer 122 when no potential difference is applied between sub-pixel electrode 106, and common electrode 108. Liquid crystal material 104 is oriented when the potential difference is applied between sub-pixel electrode 106, and common electrode 108. The orientation of liquid crystal material 104 allows the light to pass through second polarizer 122.

In an embodiment, first reflective layer 160 is placed on one side of electrode 106, while second reflective layer 150 may be placed on the opposite side of electrode 106. The second reflective layer 150 may be made of metal, reflecting or bouncing light 126 (incident from the left-hand side of FIG. 1) one or more times until the light 126 transmits through the transmissive part 112 to illuminate sub-pixel 100.

For the purpose of illustrating a clear example, straight lines indicate light path segments of lights 112, 124, 126. Each of the light path segments may comprise additional bending due to diffractions which may occur when lights 112, 124, 126 travel through junctions between media of different refractive indexes.

For the purpose of illustrating a clear example, the sub-pixel 100 is illustrated with two spacers 118a and 118b. In various embodiments, two neighboring spacers may be placed one or more pixels apart, every ten pixels apart, every twenty pixels apart, every 100 pixels apart, or other distances apart.

Figure 2A:
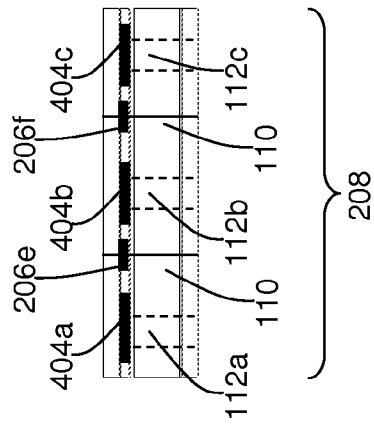
FIG. 2A illustrates a corresponding cross-sectional view of a pixel.
Figure 2:
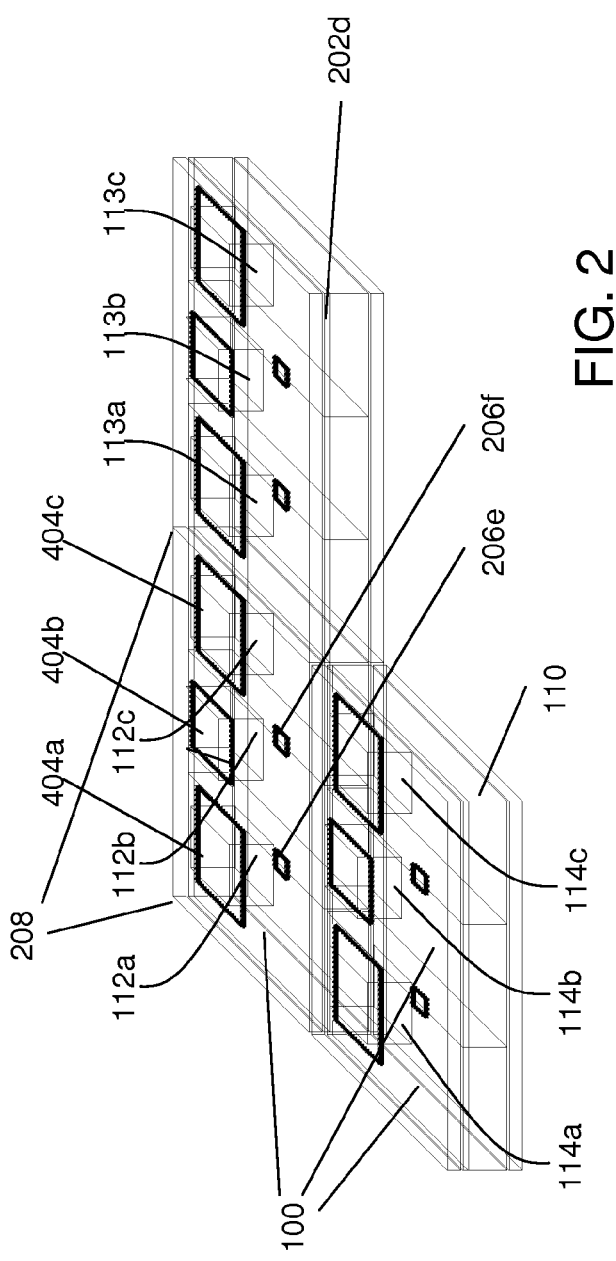
FIG. 2 illustrates the arrangement of three pixels (nine sub-pixels) of the LCD.

FIG. 2 illustrates the arrangement of nine sub-pixels 100 of the LCD. FIG. 2A illustrates a corresponding cross-sectional view of a pixel (208). Sub-pixel 100 comprises transmissive part 112b and reflective part 110. In an embodiment, transmissive parts 112a-c, as illustrated in FIG. 2 and FIG. 2A, impart red, green and blue color components respectively to form a color pixel, if the (Red-Green-Blue) RGB color system is followed. Additionally, transmissive parts 112a-c can impart different colors such as red, green, blue and white or other color combinations, if other color systems are chosen. Furthermore, transmissive part 113a and 114a impart red color, transmissive part 113b and 114b impart green color, and transmissive part 113c and 114c impart blue color to the color pixel. In some embodiments, color filters 404a-c, as illustrated in FIG. 2 and FIG. 2A, of different thicknesses can be placed over transmissive parts 112a-c to decrease or increase the saturation of the color imparted to the color pixel. Saturation is defined as intensity of a specific gradation of color within the visible spectrum. Further, a colorless filter 202d can be placed over reflective part 110. In various embodiments, the thickness of colorless filter 202d can vary from zero to the thickness of color filters 404a-c placed over transmissive parts 112a-c.

In an embodiment, transmissive parts 112a represent a subpixel of of one of the three colors of the color pixel. Similarly, transmissive parts 112b and 112c represent a sub-pixels of other two colors of the color pixel. In another embodiment, vertical oriented subpixels can be used that increase the reflective and transflective resolution by three-fold in the horizontal direction when compared to the color transmissive operating mode. In another embodiment, horizontal stripes of subpixels can be used that increase the reflective and transflective resolution by three-fold in the vertical direction when compared to the color transmissive mode.

The amount of light from light source 102 transmitting through each of the transmissive parts 112a-c is determined by the switching elements (not shown in FIG. 2). The amount of light transmitting through each transmissive parts 112a-c, in turn, determines the luminance of the color pixel. Further, the shape of transmissive parts 112a-c and the color filters 404a-c can be hexagonal, rectangular, octagonal, circular or so forth. Additionally, the shape of reflective part 110 can be rectangular, circular, octagonal, and the like.

In some embodiments, additional color filters may be placed over the reflective parts 110 of sub-pixels 100 in the pixel 208. These additional color filters may be used to provide compensating colors that help create a new monochrome white point for the sub-pixels in the pixel 208 in a monochromatic operating mode. With the new monochrome white point, the sub-pixels of the pixel 208 can be used to represent various shades of gray, collectively or individually.

For example, a color filter 206e, as illustrated in FIG. 2 and FIG. 2A, may be used to cover an area of the reflective part 110 in the sub-pixel 100 that includes transmissive part 112a. In some embodiments as illustrated in FIG. 2, the color filter 206e may cover not only (1) a portion of the reflective part 110 in the sub-pixel 100 that contains the transmissive part 112a (which imparts the red color in the present example), but also (2) a portion of the reflective part 110 in the sub-pixel 100 that contains the transmissive part 112b (which imparts the green color in the present example). The color filter 206e may be used to impart the blue color in both the sub-pixels 100 that impart the red and green colors in the pixel 208.

Similarly, a color filter 206f, as illustrated in FIG. 2 and FIG. 2A, may be used to cover an area of the reflective part 110 in the sub-pixel 100 that includes transmissive part 112c. In some embodiments as illustrated in FIG. 2, the color filter 206f may cover not only (1) a portion of the reflective part 110 in the sub-pixel 100 that contains the transmissive part 112c (which imparts the blue color in the present example), but also (2) another portion of the reflective part 110 in the sub-pixel 100 that contains the transmissive part 112b (which imparts the green color in the present example). The color filter 206f may be used to impart the red color in both the sub-pixels 100 that impart the blue and green colors in the pixel 208.

The reflective part of the red sub-pixel 100 has an area covered by the red color filter 404a and another area covered by the blue color filter 206e. The net result is that the red sub-pixel may receive red and blue color contributions from these areas covered by the color filters 404a and 206e. The same holds true for the blue sub-pixel. However, the reflective part of the green sub-pixel 100 has a first area covered by the green color filter 404b, a second area covered by the blue color filter 206e, and a third area covered by the red color filter 206f. In some embodiments, the first area may be smaller than either of the second and third areas or vice versa. In some embodiments, the second and third areas may be set to different sizes, in order to create a monochrome colorless white point. The net result is that the green sub-pixel may receive an overall red and blue color contribution from the color filters 404b, 206e and 206f that can compensate the green color contribution for the purpose of creating the monochrome colorless white point.

In some embodiments, as illustrated, these color filters 206e and 206f may cover only a portion of the reflective part 110 in a sub-pixel 100; most of the reflective part 110 in the sub-pixel 100 may be either covered by colorless filter 202d, or not covered by filters.

Embodiments may be configured for correcting other than green tinges. In various embodiments, the area covered by each of the color filters 404a-c may be the same as, or larger than, the area of the respective transmissive part 112a-c. For example, the color filter 404a that covers the transmissive part 112a may have an area larger than the area of the transmissive part 112a, as illustrated in FIG. 2 and FIG. 2A. The same may hold true for the color filters 404b and 404c, as illustrated in FIG. 2 and FIG. 2A. In these embodiments, the sizes of the color filters 404 and 206 may be placed or sized in certain ways to create a monochrome colorless white point.

In some embodiments, areas of sub-pixels 100 in the pixel 208 may or may not be the same. For example, the area of a green sub-pixel 100 that comprises the transmissive part 112b may be configured to be smaller than the areas of a red or blue sub-pixel 100 that comprises the transmissive part 112a or 112c).

In some embodiments, areas of color filters over transmissive parts 112a-c in the pixel 208 may or may not be the same. For example, the area of a green color filter 404b may be smaller than the areas of a red or blue color filter 404a, 404c.

In some embodiments, areas of color filters over the reflective part 110 in the pixel 208 may or may not be the same. For example, the area of the blue color filter 206e may be larger or smaller than the areas of the red color filter 206f.

In some embodiments, even though (1) the areas of sub-pixels 100 may be different, and/or (2) the areas covered by color filters 404a-c in the pixel 208 may be different, and/or (3) the areas covered color filters 206e and 206f in the pixel 208 may be different, reflective areas not covered by color filters in all the sub-pixels of the pixel 208 are substantially the same. As used herein, the term "substantially the same" refers to a difference within a small percentage. In some embodiments, reflective areas are substantially the same if the smallest and the largest of these reflective areas only differ within a specified range, for example, <=5%.

3. Functional Overview

Figure 3:
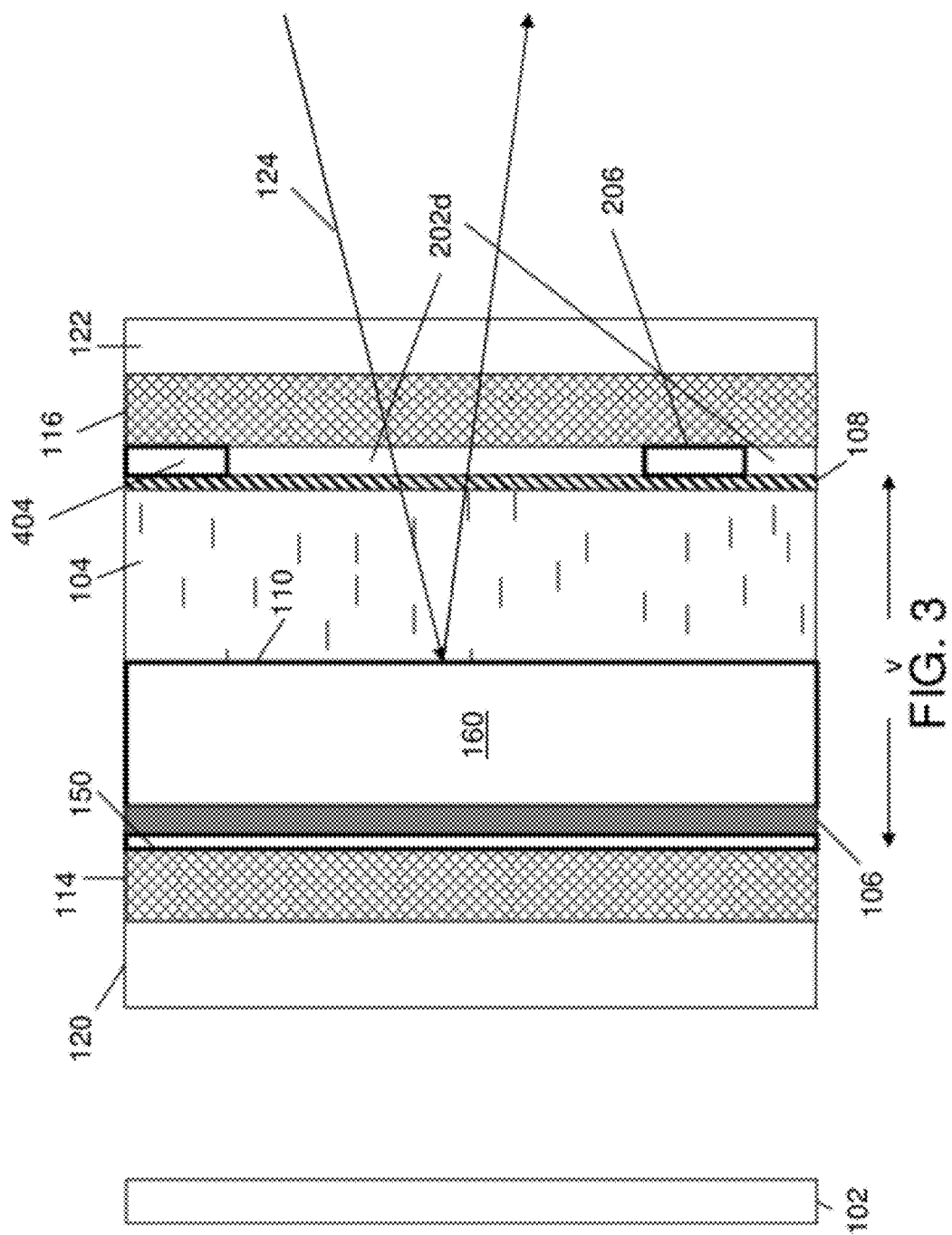
FIG. 3 illustrates the functioning of the LCD in a monochrome reflective mode.

FIG. 3 illustrates the functioning of sub-pixel 100 (for example, any of the sub-pixels 100 in FIG. 2) in the monochrome reflective mode. Since the monochrome reflective embodiment is explained with reference to FIG. 3, only reflective part 110 is shown in the figure.

Sub-pixel 100 can be used in the monochrome reflective mode in the presence of an external source of light. In an embodiment, ambient light 124 passes through a layer of filters, and liquid crystal material 104 and is incident on reflective part 110. The layer of filters may comprise (1) colorless filter 202d, (2) color filter 404 (for example, 404a of FIG. 2 when the sub-pixel 100 is the one with the transmissive part 112a in FIG. 2) extending from the area opposite to the transmissive part of the sub-pixel 100 (for example, 112a of FIG. 2), and (3) color filter 206 (for example, 206e of FIG. 2). Any, some, or all, of the filters may be used to maintain the attenuation and the path difference of ambient light 124 the same as the attenuation and the path difference of the light in the color transmissive mode. The colorless color filter 202d can also be omitted by modifying the design.

Reflective part 110 of sub-pixel 100 reflects ambient light 124 to substrate 116. In an embodiment, a potential difference (v) is applied to sub-pixel electrode 106, which is electronically coupled to the reflective part 110 and common electrode 108. Liquid crystal material 104 is oriented, depending on the potential difference (v). Consequently, the orientation of liquid crystal material 104 rotates the plane of ambient light 124, allowing the light to pass through second polarizer 122. The degree of orientation of liquid crystal material 104 therefore determines the brightness of sub-pixel 100 and consequently, the luminance of sub-pixel 100.

In an embodiment, a normally white liquid crystal embodiment can be employed in sub-pixel 100. In this embodiment, axes of first polarizer 120 and second polarizer 122 are parallel to each other. The maximum threshold voltage is applied across sub-pixel electrode 106, and common electrode 108 to block the light reflected by reflective part 110. Sub-pixel 100 therefore appears black. Alternatively, a normally black liquid crystal embodiment can be used. In this embodiment, axes of first polarizer 120 and second polarizer 122 are perpendicular to each other. The maximum threshold voltage is applied across sub-pixel electrode 106, and common electrode 108 to illuminate sub-pixel 100.

For the purpose of illustrating a clear example, the reflective part 110 is shown as a smooth straight line. Alternatively, the reflective part 110 may have a roughened or bumpy surface at the micron level or sub-micron levels.

Figure 4:
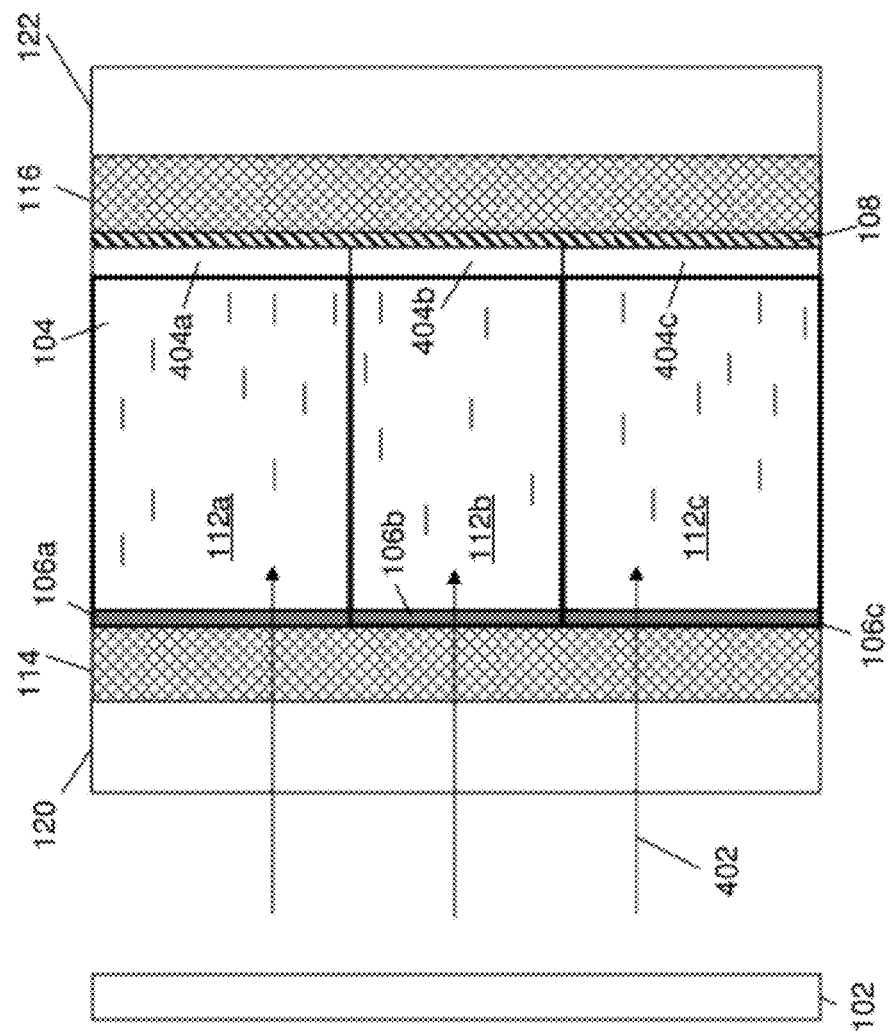
FIG. 4 illustrates the functioning of the LCD in a color transmissive mode by using a partial color filtered approach.

FIG. 4 illustrates the functioning of the LCD in the color transmissive mode by using a partial color filtered approach. Since the color transmissive embodiment is being explained, only transmissive parts of the sub-pixel: 112a-c are shown in FIG. 4. On substrate 116, color filters 404a, 404b and 404c are respectively placed in transmissive sub-pixel parts 112a, 112b and 112c, as shown in FIG. 4. Sub-pixel parts 112a, 112b and 112c refer to the sub-pixel optical value. Part 112a has optical contributions from part 102, 402, 120, 114, 106a, 104, 404a 108, 116 and 122. Part 112b has optical contributions from part 102, 402, 120, 114, 106b, 104, 404b, 108, 116, and 122. Part 112c has optical contributions from part 102, 402, 120, 114, 106c, 104, 404c, 108, 116, and 122. Color filters 404a, 404b, and 404c are also spread partially over (or extending out to a part of) the reflective area of the sub-pixel. In various embodiments, the color filters cover any amount that is less than half the reflective area of the pixel (for example, 0% to 50% of the area) and in one particular embodiment the color filters cover about 0% of the area, and in another particular embodiment they cover 6% to 10% of the area, and in yet another particular embodiment they cover 14% to 15% of the area.

Light source 102 is a backlight source producing light 402 that can be collimated by using a collimating light guide or lens. In an embodiment, light 402, coming from light source 102, is passed through first polarizer 120. This aligns the plane of light 402 in a particular plane. In an embodiment, the plane of light 402 is aligned in the horizontal direction. Additionally, second polarizer 122 has an axis of polarization in the vertical direction. Transmissive parts 112a-c transmit light 402. In an embodiment, each of transmissive parts 112a-c has an individual switching element. The switching element controls the intensity of light 402 passing through the corresponding transmissive part.

Further, light 402, after transmitting through transmissive parts 112a-c, passes through liquid crystal material 104. Transmissive parts 112a, 112b, and 112c are provided with sub-pixel electrodes 106a-c respectively. The potential differences applied between sub-pixel electrode 106a-c, and common electrode 108 determine the orientation of liquid crystal material 104. The orientation of liquid crystal material 104, in turn, determines the intensity of light 402 incident on each color filter 404a-c.

In an embodiment, a green color filter 404a is placed mostly or completely over transmissive part 112a and may also be placed partially the reflective portion 110 (shown in FIGS. 2 and 3), a blue color filter 404b is placed mostly or completely over transmissive part 112b and may also be placed partially over the reflective portion 110 (shown in FIGS. 2 and 3) and a red color filter 404c is placed mostly or completely over transmissive part 112c and may also be partially over the reflective part 110 (shown in FIGS. 2 and 3). Each of color filters 404a-c imparts the corresponding color to the color pixel. The colors imparted by color filters 404a-c determine the chrominance value of the color pixel. Chrominance contains the color information such as hue and saturation for a pixel. Further, if there is ambient light 124, the light reflected by reflective part 110 (shown in FIGS. 2 and 3) provides luminance to the color pixel and imparts a monochrome adjustment to the white reflectance of the pixel which can compensate for the greenish look of the LC mode. This luminance therefore increases the resolution in the color transmissive mode. Luminance is a measure of the brightness of a pixel.

As illustrated in FIG. 4, the transmissive parts 112a-c may have different cross sectional areas (which normal directions are the horizontal direction in FIG. 4). For example, the green transmissive part 112b may have a smaller area than those of the red and blue transmissive part 112a and 112c, as the green light may transmit more efficiently in the sub-pixel 100 than the lights of other colors. The cross sectional areas for transmissive parts 112a-c as illustrated in FIG. 4 here, and FIG. 5 and FIG. 6 below, may or may not be different in various embodiments.

Figure 5:
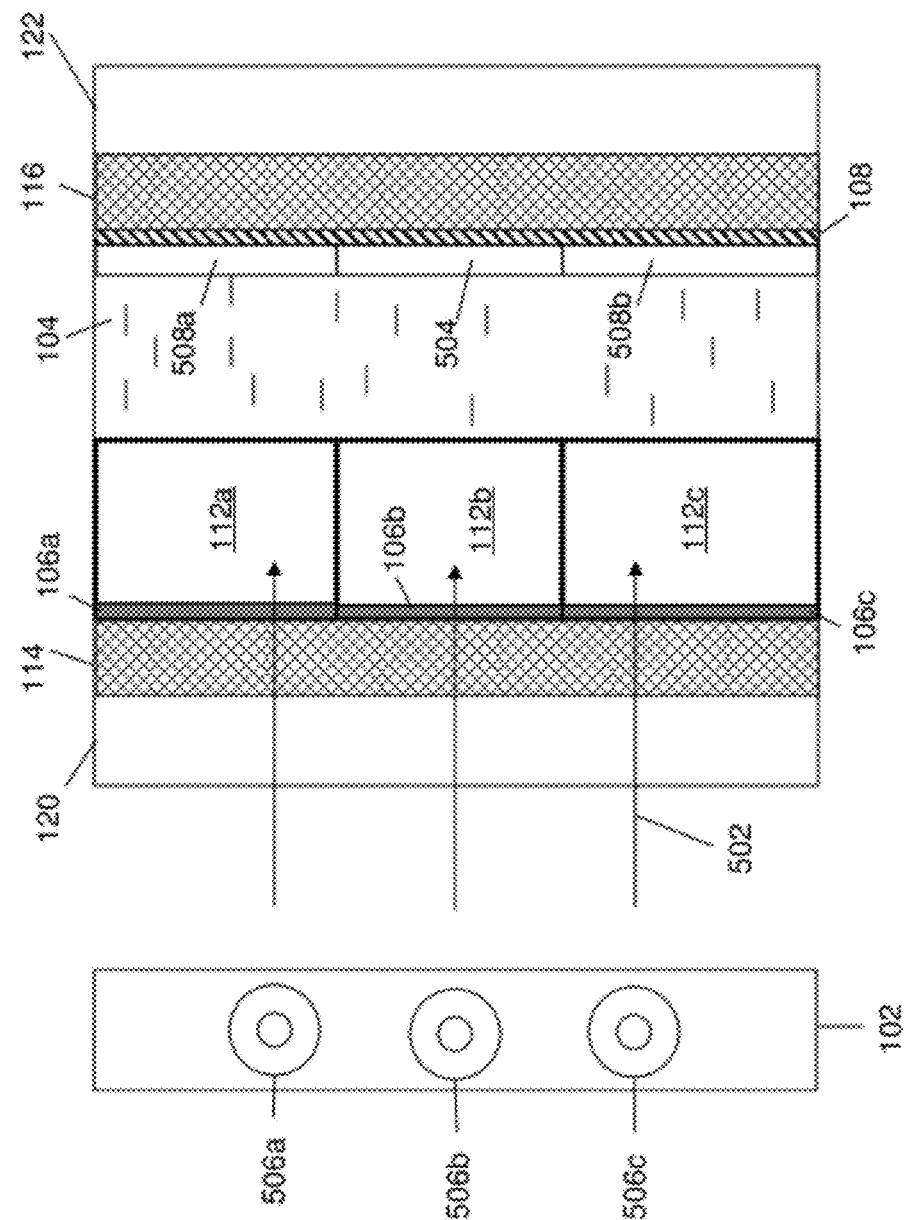
FIG. 5 illustrates the functioning of the LCD in a color transmissive mode by using a hybrid field sequential approach.

FIG. 5 illustrates the functioning of the LCD in the color transmissive mode by using a hybrid field sequential approach, in accordance with various embodiments. Since the color transmissive embodiment is being explained, only transmissive parts 112a-c are shown in FIG. 5. In an embodiment, light source 102 comprises strips of LEDs such as LED group 1, LED group 2 and so on (not shown). In an embodiment, the LEDs that are arranged horizontally are grouped together, one LED group below the other, to illuminate the LCD. Alternatively, the LEDs that are arranged vertically can be grouped.

The LEDs groups are illuminated in a sequential manner. The frequency of illumination of an LED group can be between 30 frames to 540 frames per second. In an embodiment, each LED group comprises red LEDs 506a, white LEDs 506b and blue LEDs 506c. Further, red LEDs 506a and white LEDs 506b of LED group 1 are on from time t=0 to t=5 and red LEDs 506a and white LEDs 506b of LED group 2 are on from time t=1 to t=6. Similarly, all the red and white LEDs of other LED groups function in a sequential manner. In an embodiment, each LED group illuminates a horizontal row of pixels of the LCD, in case the LED groups are arranged vertically. Similarly blue LEDs 506c and white LEDs 506b of LED group 1 are on from time t=5 to t=10, and blue LEDs 506c and white LEDs 506b of LED group 2 are on from time t=6 to t=11. Similarly, all the blue and white LEDs of other LED groups are on in a sequential manner. Red LEDs 506a, white LEDs 506b and blue LEDs 506b are arranged so that red LEDs 506a and blue LEDs 506b illuminate transmissive parts 112a and 112c and white LEDs 506b illuminate transmissive part 112b. In another embodiment, the LED groups may comprise red, green and blue LEDs. Red, green and blue LEDs are so arranged that green LEDs illuminate transmissive part 112b and red and blue LEDs illuminate transmissive parts 112a and 112c, respectively.

In an embodiment, light 502 from light source 102 is passed through first polarizer 120. First polarizer 120 aligns the plane of light 502 in a particular plane. In an embodiment, the plane of light 502 is aligned in a horizontal direction. Additionally, second polarizer 122 has the axis of polarization in the vertical direction. Transmissive parts 112a-c transmit light 502. In an embodiment, each of transmissive parts 112a-c has an individual switching element. Further, switching elements control the intensity of light passing through each of transmissive parts 112a-c, thereby controlling the intensity of the color component. Further, light 502, after passing through transmissive parts 112a-c, passes through liquid crystal material 104. Each of transmissive parts 112a-c has its own sub-pixel electrode 106a-c respectively. The potential differences applied between sub-pixel electrodes 106a-c, and common electrode 108 determines the orientation of liquid crystal material 104. In the embodiment in which red, white, and blue LEDs are used, the orientation of liquid crystal material 104, in turn, determines the intensity of light 502 incident on a green color filter 504, and transparent spacers 508a and 508b.

The intensity of light 502 passing though green filter 504, and transparent spacers 508a and 508b determines the chrominance value of the color pixel. In an embodiment, green color filter 504, is placed corresponding to transmissive part 112b. Transmissive part 112a and 112c do not have a color filter. Alternatively, transmissive parts 112a and 112c can use transparent spacers 508a and 508b respectively. Green color filter 504, transparent spacers 508a and 508b are located on substrate 116. In another embodiment, magenta color filters can be placed over transparent spacers 508a and 508b. In an embodiment, during time t=0 to t=5, when red LED 506a and white LED 506b are on, transmissive parts 112a and 112c are red and green filter 504 imparts a green color to transmissive part 112b. Similarly, during time t=6 to t=11, when blue LED 506c and white LEDs 506b are on, transmissive parts 112a and 112c are blue, and green filter 504 imparts a green color to transmissive part 112b. The color imparted to the color pixel is formed by the combination of colors from transmissive parts 112a-c. Further, if ambient light 124 is available, the light reflected by reflective part 110 (shown in FIGS. 2 and 3) provides luminance to the color pixel. This luminance therefore increases the resolution in the color transmissive mode.

Figure 6:
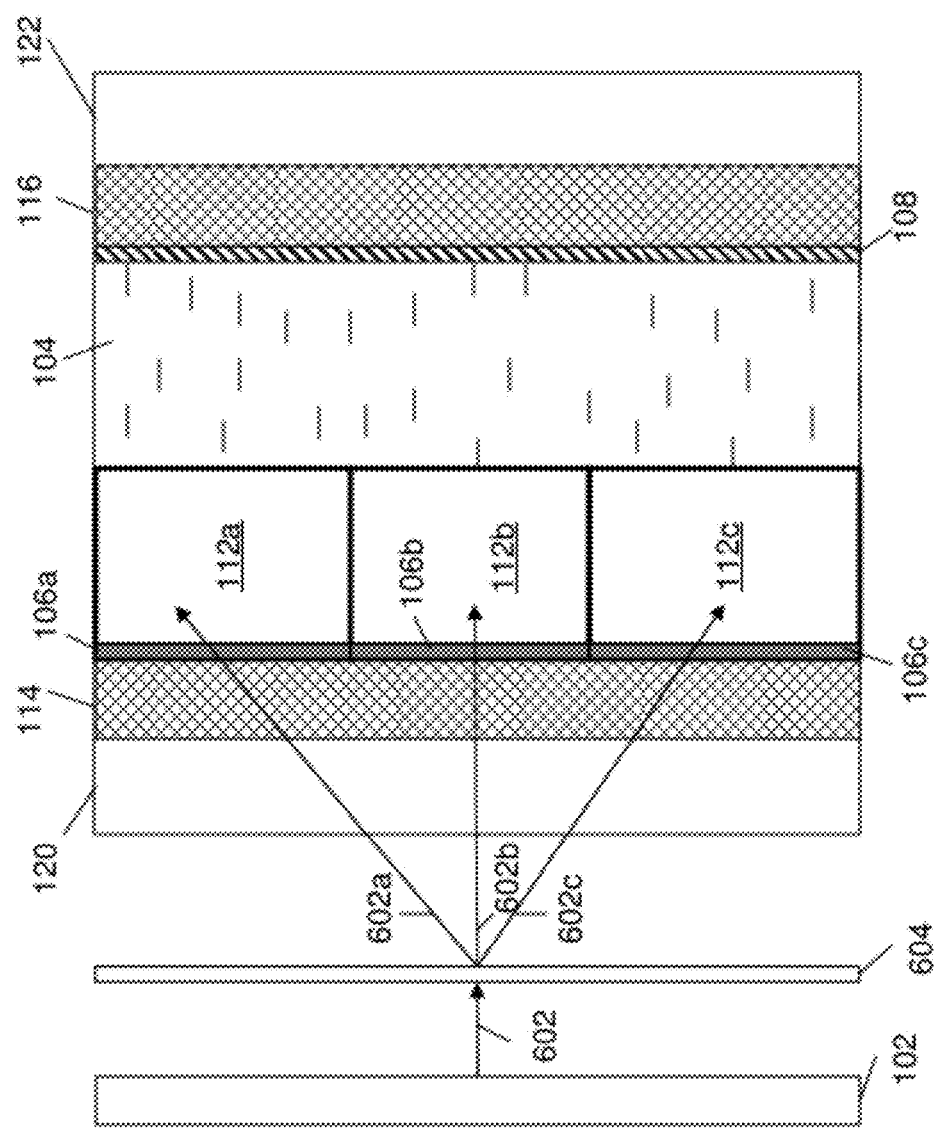
FIG. 6 illustrates the functioning of the LCD in a color transmissive mode by using a diffractive approach.

FIG. 6 illustrates the functioning of the LCD in the color transmissive mode by using a diffractive approach. Since the color transmissive embodiment is being explained, only transmissive parts 112a-c are shown in FIG. 6. Light source 102 can be a standard backlight source. In an embodiment, light 602 from light source 102 is split into a green component 602a, a blue component 602b and a red component 602c by using a diffraction grating 604. Alternatively, light 602 can be split into a spectrum of colors with a different part of the spectrum going through each of transmissive parts 112a-c using a micro-optical structure. In an embodiment, the micro-optical structure is a flat film optical structure with small lensets that can be stamped or imparted into the film. Green component 602a, blue component 602b and red component 602c are directed to transmissive parts 112a, 112b and 112c, respectively, using diffraction grating 604.

Further, the components of light 602 are passed through first polarizer 120. This aligns the plane of light components 602a-c in a particular plane. In an embodiment, the plane of light components 602a-c is aligned in the horizontal direction. Additionally, second polarizer 122 has its axis of polarization in the vertical direction. Transmissive parts 112a-c allow light components 602a-c to be transmitted through them. In an embodiment, each of transmissive parts 112a-c has an individual switching element. Switching elements control the intensity of light passing through each of transmissive parts 112a-c, thereby controlling the intensity of the color component. Further, light components 602a-c, after passing through transmissive parts 112a-c, passes through liquid crystal material 104. Transmissive parts 112a, 112b and 112c respectively have pixel electrodes 106a, 106b and 106c. The potential differences applied between pixel electrodes 106a-c, and common electrode 108 determines the orientation of liquid crystal material 104. The orientation of liquid crystal material 104, in turn, determines the intensity of light components 602a-c passing through second polarizer 122. The intensity of color components passing through second polarizer 122 in turn decides the chrominance of the color pixel. Further, if ambient light is available, the light reflected by reflective part 110 (shown in FIGS. 2 and 3) provides luminance to the color pixel. This luminance therefore increases the resolution in the color transmissive mode.

As presented herein, the presence of ambient light enhances the luminance of the color pixel in the color transmissive mode. Therefore, each pixel has both luminance and chrominance. This increases the resolution of the LCD. Consequently, the number of pixels required for a particular resolution is lower than in prior known LCDs, thereby decreasing the power consumption of the LCD. Further, a Transistor-Transistor Logic (TTL) based interface can be used that lowers the power consumption of the LCD as compared to the power consumed by the interfaces used in prior known LCDs. Additionally, because the timing controller stores the signals related to pixel values, the LCD is optimized for using the self refresh property, thereby decreasing the power consumption. In various embodiments, thinner color filters which transmit less saturated color and more light can be used. Hence, various embodiments facilitate the process of reducing the power consumption, as compared to prior known LCDs.

Further, in an embodiment (described in FIG. 5), green or white color light is always visible on sub-pixel 100, and only the red and blue color lights are switched. Therefore, a lower frame rate may be used as compared to the frame rate of prior known field sequential displays.

4. Driving Signal Techniques

In some embodiments, a pixel in a multi-mode LCD as described herein can be used in the color transmissive mode in the same manner as a standard color pixel. For example, three sub-pixels in the pixel 208 (FIG. 2) of the multi-mode LCD can be electronically driven by a multi-bit signal representing a RGB value (for example, a 24-bit signal) to produce the specified red, green, and blue component colors in the pixel.

In some embodiments, a pixel in a multi-mode LCD as described herein can be used as a black-and-white pixel in a black-and-white reflective mode. In some embodiments, three sub-pixels in a pixel of the multi-mode LCD can be individually, or alternatively collectively, electronically driven by a single 1-bit signal to produce either black or white in the sub-pixels. In some embodiments, each of the sub-pixels in a pixel of the multi-mode LCD can be individually electronically driven by a different 1-bit signal to produce either black or white in each sub-pixel. In these embodiments, power consumption is drastically reduced by (1) using 1-bit signals as compared with the multi-bit signals in the color transmissive mode and/or (2) using ambient light as a main source of the light. In addition, in the black-and-white reflective modes where each sub-pixel can be individually driven by a different bit value and each sub-pixel is an independent unit of display, the resolution of the LCD in these operating modes can be made as high as three times the resolution of the LCD operating in other modes in which a pixel is used as an independent unit of display.

In some embodiments, a pixel in a multi-mode LCD as described herein can be used as a gray pixel (for example, in a 2-bit-, 4-bit-, or 6-bit-gray-level reflective mode). In some embodiments, three sub-pixels in a pixel of the multi-mode LCD can be collectively electronically driven by a single multi-bit signal to produce a shade of gray in the pixel. In some embodiments, each of the sub-pixels in a pixel of the multi-mode LCD can be individually electronically driven by a different multi-bit signal to produce a shade of gray in each sub-pixel. Similar to the black-and-white operating mode, in these embodiments of different gray-level reflective modes, power consumption may be drastically reduced by (1) using signals of a lower number of bits as compared with the multi-bit signals in the color transmissive mode and/or (2) using ambient light as a main source of the light. In addition, in the gray-level operating modes where each sub-pixel can be individually driven by a different bit value and each sub-pixel is an independent unit of display, the resolution of the LCD in these operating modes can be made as high as three times the resolution of the LCD in other operating modes in which a pixel is used as an independent unit of display.

In some embodiments, a signal may be encoded into the video signal that instructs a display driver what operating mode and what corresponding resolution to drive. A separate line may be used to inform the display to go into a low-power mode.

5. Low Field Rate Operations

In some embodiments, a low field rate may be used to reduce power consumption. In some embodiments, the driver IC for the multi-mode LCD may run with a slow liquid crystal and may comprise electronics that allow the electric charge to be held longer at a pixel. In some embodiments, metal layers 110, 150 of FIG. 1 and electrode layer 106 (which may be an oxide layer) may operate as additional capacitors to hold the electric charge.

In some embodiments, a layer of liquid crystal material 104 having a high value of Δn, termed a thick LC material, may be used. For example, LC material with Δn=0.25 may be used. Such a thick liquid crystal may switch states with a low field rate, and may have a high voltage holding ratio and long life even at the slow switching frequency. In one embodiment, the 5 CB liquid crystal material commercially available from Merck may be used.

Figure 7:
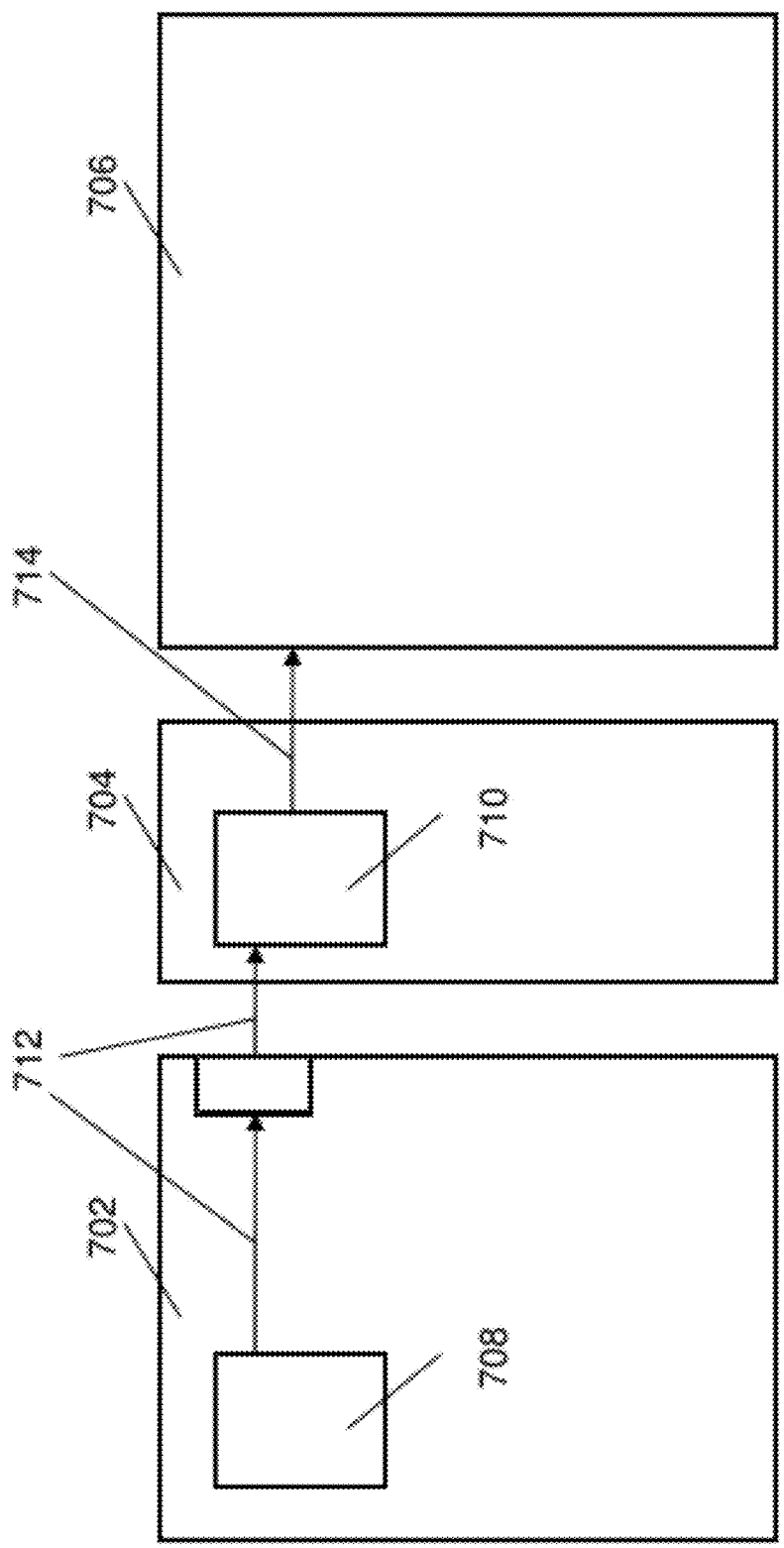
FIG. 7 illustrates an example configuration in which a multi-mode LCD runs at a low field rate without flicker.

FIG. 7 illustrates an example configuration in which a multi-mode LCD (706) runs at a low field rate without flicker. A chipset 702 that contains a CPU (or a controller) 708 may output a first timing control signal 712 to timing control logic 710 in a LCD driver IC 704. The timing control logic 710 in turn may output a second timing control signal 704 to the multi-mode LCD 706. In some embodiments, the chipset 702 may, but is not limited to, be a standard chipset that can be used to drive different types of LCD displays including the multi-mode LCD 706 as described herein.

In some embodiments, the driver IC 704 is interposed between the chipset 702 and the multi-mode LCD 706, and may contain specific logic to drive the multi-mode LCD in different operating modes. The first timing control signal 712 may have a first frequency such as 30 hz, while the second timing control signal 714 may have a second frequency in relation to the first frequency in a given operating mode of the multi-mode LCD. In some embodiments, the second frequency may be configured or controlled to be one half of the first frequency in the reflective mode. As a result, the second timing control signal 714 received by the multi-mode display 706 may be a smaller frequency than that for a standard LCD display in that mode. In some embodiments, the second frequency is regulated by the timing control logic 710 to have different relationships with the first frequency depending on the operating modes of the multi-mode LCD 706. For example, in the color transmissive mode, the second frequency may be the same as the first frequency.

In some embodiments, a pixel such as pixel 208 of FIG. 2 may be formed substantially as a square while the sub-pixels 100 may be formed as rectangles that are arranged such that the short sides of the rectangles are adjacent. In these embodiments, a sub-pixel 100 is said to be oriented in the direction of the long side of its rectangle form. In some embodiments, the multi-mode LCD is substantially in the form of a rectangle. The sub-pixels in the LCD may be oriented along the long side of the LCD rectangle or the short side of the LCD rectangle.

For example, if the multi-mode LCD is used mainly for e-reader applications, then the multi-mode LCD may be used in the portrait mode with the long side in the vertical (or up) direction. The sub-pixels 100 may be configured to orient in the long side direction of the multi-mode display. On the other hand, if the multi-mode LCD is used for various different applications such as video, reading, internet, and game, then the multi-mode LCD may be used in the landscape mode with the long side in the horizontal direction. The sub-pixels 100 may be configured to orient in the short side direction of the multi-mode display. Thus, the orientation of the sub-pixels in the multi-mode LCD display may be set in such a way as to enhance the readability and resolution of the contents in its main uses.

6. Extensions and Variations

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A multi-mode liquid crystal display comprising a plurality of pixels, each pixel comprising a plurality of sub-pixels, a sub-pixel in the plurality of sub-pixels comprising:
    a first polarizing layer with a first polarization axis;
    a second polarizing layer with a second polarization axis;
    a first substrate layer and a second substrate layer opposite to the first substrate layer, wherein the first substrate layer and the second substrate layer are interposed between the first polarizing layer and the second polarizing layer;
    a liquid crystal material between the first substrate layer and the second substrate layer;
    a first reflective layer adjacent to the first substrate layer, wherein the first reflective layer comprises at least one opening that forms in part a transmissive part of the sub-pixel and wherein a remainder of the first reflective layer forms in part a reflective part of the sub-pixel;
    a first filter of a first color opposite to and covering the transmissive part with a larger area than an area of the transmissive part; and
    a second filter of a second color opposite to and partially covering the reflective part, wherein the second color is different from the first color.

2. The multi-mode liquid crystal display according to claim 1, wherein a first side of the display is on a first side of the second substrate layer and wherein the first reflective layer is on a second, different side of the second substrate layer, further comprising a light source that provides light at a second, opposite side of the display through the at least one opening in the first reflective layer.

3. The multi-mode liquid crystal display according to claim 2, further comprising a diffractive grating or a micro-optical film configured to disperse light from the light of the light source into a spectrum of color.

4. The multi-mode liquid crystal display according to claim 1, wherein a cross sectional area of the reflective part of the sub-pixel is over half of a total cross sectional area of the sub-pixel.

5. The multi-mode liquid crystal display according to claim 1, wherein the second filter of the second color extends over and partially covers an area of a different sub-pixel.

6. The multi-mode liquid crystal display according to claim 1, further comprising a third filter of a third color opposite to and partially covering a different area of the reflective part of the sub-pixel, wherein the third color is different from both the first color and the second color.

7. The multi-mode liquid crystal display according to claim 1, wherein reflective areas not covered by color filters in all sub-pixels of a pixel are substantially the same.

8. The multi-mode liquid crystal display according to claim 1, wherein the first reflective layer comprises a metal.

9. The multi-mode liquid crystal display according to claim 1, further comprising a first electrode layer adjacent to the first substrate layer and a second electrode layer adjacent to the second substrate layer, wherein the liquid crystal material is interposed between the first electrode layer and second electrode layer.

10. The multi-mode liquid crystal display according to claim 9, wherein the first electrode layer is an oxide layer.

11. The multi-mode liquid crystal display according to claim 1, further comprising a second reflective layer on one side of the first electrode layer while the first reflective layer is on an opposite side of the first electrode layer, wherein the second reflective layer comprises at least one opening that is a part of the transmissive part of the sub-pixel.

12. The multi-mode liquid crystal display according to claim 1, wherein the first and second color filters are configured to shift a monochrome white point for the sub-pixel.

13. The multi-mode liquid crystal display according to claim 1, wherein the transmissive part occupies an interior part of a cross section of the sub-pixel.

14. The multi-mode liquid crystal display according to claim 1, wherein the first and second color-filters are of different thicknesses.

15. The multi-mode liquid crystal display according to claim 1, wherein the first and second color-filters are of a same thickness.

16. The multi-mode liquid crystal display according to claim 1, further comprising one or more colorless spacers over the reflective part.

17. The multi-mode liquid crystal display according to claim 16, wherein the one or more colorless spacers are of a same thickness.

18. The multi-mode liquid crystal display according to claim 16, wherein the one or more colorless spacers are of different thicknesses.

19. The multi-mode liquid crystal display according to claim 1, further comprising a driver circuit configured to provide pixel driving signals to a plurality of switching elements, wherein the plurality of switching elements determines an intensity of light transmitting through the transmissive part.

20. The multi-mode liquid crystal display according to claim 19, wherein the driver circuit further comprises a Transistor-Transistor-Logic interface.

21. The multi-mode liquid crystal display according to claim 19, further comprising a timing control circuit configured to refresh the pixel values of the multi-mode liquid crystal display.

22. The multi-mode liquid crystal display according to claim 1, wherein 1% to 50% of the reflective part has a color filter.

23. A computer, comprising:
    one or more processors;
    a multi-mode liquid crystal display coupled to the one or more processors and comprising a plurality of pixels, each pixel comprising a plurality of sub-pixels, a sub-pixel in the plurality of sub-pixels comprising:
        a first polarizing layer with a first polarization axis;
        a second polarizing layer with a second polarization axis;

a first substrate layer and a second substrate layer opposite to the first substrate layer, wherein the first substrate layer and the second substrate layer are interposed between the first polarizing layer and the second polarizing layer;

a liquid crystal material between the first substrate layer and the second substrate layer;

a first reflective layer adjacent to the first substrate layer, wherein the first reflective layer comprises at least one opening that forms in part a transmissive part of the sub-pixel and wherein a remainder of the first reflective layer forms in part a reflective part of the sub-pixel;

a first filter of a first color opposite to and covering the transmissive part with a larger area than an area of the transmissive part; and a second filter of a second color opposite to and partially covering the reflective part, wherein the second color is different from the first color.

24. The computer according to claim 23, wherein a first side of the display is on a first side of the second substrate layer and wherein the first reflective layer is on a second, different side of the second substrate layer, further comprising a light source that provides light at a second, opposite side of the display through the at least one opening in the first reflective layer.

25. The computer according to claim 23, wherein reflective areas not covered by color filters in all sub-pixels of a pixel are substantially the same.

26. The computer according to claim 23, wherein the first reflective layer comprises a metal.

27. The computer according to claim 23, further comprising a second reflective layer on one side of the first electrode layer while the first reflective layer is on an opposite side of the first electrode layer, wherein the second reflective layer comprises at least one opening that is a part of the transmissive part of the sub-pixel.

28. The computer according to claim 23, further comprising a second reflective layer adjacent to the first reflective layer on an opposite side of the first substrate layer, wherein the second reflective layer comprises at least one opening that is a part of the transmissive part of the sub-pixel.

29. The computer according to claim 23, further comprising one or more colorless spacers over the reflective part.

30. The computer according to claim 23, further comprising a driver circuit configured to provide pixel driving signals to a plurality of switching elements, wherein the plurality of switching elements determines an intensity of light transmitting through the transmissive part.

* * * * *